United States Patent [19]

Manning

[11] Patent Number: 4,552,852

[45] Date of Patent: Nov. 12, 1985

[54] ALUMINA CERAMIC COMPRISING A SILICEOUS BINDER AND AT LEAST ONE OF ZIRCONIA AND HAFNIA

[75] Inventor: William R. Manning, Richmond, Mich.

[73] Assignee: Champion Spark Plug Company, Toledo, Ohio

[21] Appl. No.: 625,095

[22] Filed: Jun. 27, 1984

[51] Int. Cl.$^4$ .................... C04B 35/10; C04B 35/48
[52] U.S. Cl. .................................. 501/105; 264/60; 264/66; 264/82; 501/94; 501/128; 501/152
[58] Field of Search ............... 501/94, 105, 127–128, 501/152, 153; 264/60, 62, 66, 82

[56] References Cited

U.S. PATENT DOCUMENTS

| | | | |
|---|---|---|---|
| 3,360,203 | 12/1967 | Smoke et al. | 241/15 |
| 3,615,763 | 10/1971 | Flock | 501/128 |
| 4,279,654 | 7/1981 | Yajima et al. | 264/62 |
| 4,313,900 | 2/1982 | Gonzales | 264/62 |
| 4,316,964 | 2/1982 | Lange | 501/105 |
| 4,421,861 | 12/1983 | Claussen et al. | 501/105 |

FOREIGN PATENT DOCUMENTS

2447787  4/1976  Fed. Rep. of Germany ........... 3/1.9

OTHER PUBLICATIONS

Butler, E. P. et al., "X-Ray Microanalysis of $ZrO_2$ Particles in $ZrO_2$ Toughened $Al_2O_3$", Commun. of Am. Cer. Soc., Dec. 1982, pp. C206–C207.

*Primary Examiner*—Helen M. McCarthy
*Attorney, Agent, or Firm*—John C. Purdue

[57] ABSTRACT

A ceramic composed of 1 to 15 percent of glass and 99 to 85 percent of a mixture of particulates is disclosed. The glass, present as a vitreous phase bonding the particulates into a dense, gas impervious structure, contains 45 to 80 percent of $SiO_2$, 8 to 65 percent of CaO and MgO and not more than 15 percent of $Al_2O_3$. The particulates, which are finer than 15 microns in ultimate particle size, include $Al_2O_3$ and at least one of $ZrO_2$, $HfO_2$ and solid solutions of the two. The ceramics are subject to microcracking, which can be cured by refiring, or prevented by including particulate $Y_2O_3$ as a stabilizer.

12 Claims, No Drawings

ALUMINA CERAMIC COMPRISING A SILICEOUS BINDER AND AT LEAST ONE OF ZIRCONIA AND HAFNIA

DEFINITIONS

As used herein, and in the appended claims, the terms "percent" and "parts" refer to percent and parts by weight, unless otherwise indicated.

All temperatures herein are degrees C., unless otherwise indicated.

BACKGROUND OF THE INVENTION

1. Field of the Invention

This invention relates to an alumina-zirconia or alumina-hafnia ceramic that is highly resistant to thermal shock and can be produced by a method which lends itself to mass production.

2. The Prior Art

The subject of alumina-zirconia ceramics produced both by hot pressing and by sintering technique has received a great deal of attention during recent years. A journal article, Cer.Eng. and Sci.Proc., Vol. 1, 7-8(B) 1980, is considered to be typical of the prior art relating to such ceramics made by hot pressing. The article, D. Lewis III and P. F. Becher, "Thermal Shock Behavior in $Al_2O_3$-based composites", reports test data indicating that alumina-zirconia composites which were studied are highly resistant to thermal shock. The data relate to alumina ceramics and to ceramics composed of alumina and up to 30 percent by volume of $ZrO_2$ produced by hot pressing at 1500°–1600° and 35 MPa (about 5075 pounds per square inch). The data presented indicate the alumina-zirconia ceramics to have outstanding thermal shock properties. Another Journal article, J.Am.-Cer.Soc., 61, No. 12, pp. 85, 86, and U.S. Pat. No. 4,218,253, are illustrative of the prior art relating to the production of such ceramics by sintering. The patent discloses (Example 1) the production of an alumina-zirconia ceramic from aluminum oxide powder (average particle size 5 microns) and monoclinic zirconium oxide powder (average particle size 1 micron). The process involves wet mixing the two powders, drying and granulating the mixture, isostatically pressing a shape from the granules, and sintering the shape at 1600° for one hour. The Journal article discloses a similar process, including sintering at 1500° and at 1600°, but is silent as to particle size, disclosing only that "composites with a very fine and homogeneous dispersion" were achieved "by a wet-chemical method, starting from a zirconium sulfate-aluminum sulfate solution." It will be appreciated that hot pressing alumina-zirconia ceramics at 1500°–1600° and 35 MPa is a costly procedure, that even sintering at 1600° is costly, and that alumina produced by a wet chemical method from a zirconium sulfate-aluminum sulfate solution is a costly starting material. Accordingly, as might be expected, the ceramics produced by the methods of the subject reference, and all other alumina-zirconia ceramics that have been suggested by the known prior art, are costly and have found only limited commercial use, for example as tool bits.

SUMMARY OF THE INVENTION

The instant invention is based upon the discovery of a ceramic composed of a mixture of particulate $Al_2O_3$, particulate $ZrO_2$ and glass bonding the $Al_2O_3$ and the $ZrO_2$ into a dense, gas impervious structure. It has also been found that all or any part of the particulate $ZrO_2$ in such ceramics can be replaced by particulate $HfO_2$ or by a solid solution of $HfO_2$ and $ZrO_2$, in particulate form, and that $Y_2O_3$ can advantageously be present to stabilize at least a part of the $ZrO_2$, the $HfO_2$, or the $ZrO_2$-$HfO_2$ solid solution in a cubic crystalline structure. In general, the glass constitutes from 1 to 15 percent of the ceramic, and the particulate mixture constitutes from 99 to 85 percent thereof. The particulate $ZrO_2$, the particulate $HfO_2$, the particulate $ZrO_2$-$HfO_2$ solid solution, the particulate $Y_2O_3$, and the particulate $Al_2O_3$ in the ceramic, or whichever ones are present, should all be finer than 15 microns in particle size, preferably finer than 10 microns. $Al_2O_3$ constitutes from 75 to 85 percent based upon the weight of $ZrO_2$, $HfO_2$, $Y_2O_3$ and $Al_2O_3$ in the ceramic; $Y_2O_3$, $ZrO_2$ and $HfO_2$ together constitute from 15 to 25 percent, based upon the weight of $Y_2O_3$, $ZrO_2$, $HfO_2$ and $Al_2O_3$ in the ceramic. The glass is of the calcium magnesium silicate type, containing from 45 to 80 percent of $SiO_2$, from 8 to 55 percent of CaO and MgO and not more than 15 percent of $Al_2O_3$. Preferred and optimum percentages of glass, of $Y_2O_3$ and of $ZrO_2$, $HfO_2$ and $Y_2O_3$ is a ceramic according to the instant invention are set forth in the following Table:

|  | Preferred | Optimum |
| --- | --- | --- |
| Percent of glass in ceramic | 3–12 | 5–10 |
| Percent of $ZrO_2$, $HfO_2$ and $Y_2O_3$ based upon the weight of $ZrO_2$, $HfO_2$, $Y_2O_3$ and $Al_2O_3$ therein | 16–18 | Substantially 17 |
| Percent of $Y_2O_3$, based upon the weight of $ZrO_2$, $HfO_2$ and $Y_2O_3$ therein | 3–9 | 3–6 |

Conversely, it is preferred that particulate $Al_2O_3$, based upon the weight of $ZrO_2$, $HfO_2$, $Y_2O_3$ and $Al_2O_3$ in a ceramic according to the invention be from 82 to 84 percent, most desirably, on the indicated basis, particulate $Al_2O_3$ is substantially 83 percent.

A ceramic according to the instant invention can be produced by pressing a suitable batch into a desired shape and firing the shape, usually to a temperature from about 1350° to about 1650°. A suitable procedure is described in Example 1, infra. A ceramic so produced has excellent resistance to thermal shock and is reasonably strong mechanically. It has been found, however, that such ceramics are subjected to micro cracking, and that the micro cracking occurs spontaneously a comparatively short time after firing to maturity. In some instances, the occurrence of micro cracking has been delayed for sufficiently long that it was possible to obtain modulus of rupture data prior to micro cracking; in these cases, good strength properties were indicated. Even after micro cracking, the ceramic according to the invention still has a modulus of rupture in the vicinity of 20,000 pounds per square inch.

It will be apparent that even a micro cracked ceramic according to the instant invention can be used as a catalyst support, for example in the configuration of a honeycomb structural body. Such bodies are presently made from ceramic batch which produces a fired cordierite body containing from 46 to 53 percent of $SiO_2$, from 31 to 41 percent of $Al_2O_3$, from 11 to 16 percent of MgO and up to about 3 percent of impurities. The ceramic of the invention can be produced in a honeycomb structure by the methods used to produce cordierite honeycomb structural bodies by substituting for the cordierite forming batch a different batch suitable for producing a ceramic according to the invention. The modified method (see, for example, U.S. Pat. No. 4,279,849) can involve mixing a binder such as starch paste, methyl cellulose or polyvinyl alcohol and water with 16.8 parts of $ZrO_2$, 67.2 parts of $Al_2O_3$ and 16 parts of clays and other fluxes, kneading the resulting mixture, extruding the kneaded mixture, and then drying and firing the shaped article. The clays and other fluxes should contain $SiO_2$, MgO, CaO and $Al_2O_3$ in such proportions that the fired article contains 73.2 percent of $Al_2O_3$, 16.8 percent of $ZrO_2$, 7.56 percent of $SiO_2$, 1.68 percent of MgO and 0.76 percent of CaO. The procedure described above produces a substantially impervious ceramic. Pervious bodies, usually preferred as catalyst supports, can be produced by adding graphite or carbon powder to the charge, prior to kneading, drying and firing. The amount of graphite or carbon added usually ranges from 1 to 30 parts per 100 parts of the ceramic batch material; the porosity of the final ceramic varies as a direct function of the amount of graphite or carbon powder used in the batch. U.S. Pat. No. 3,824,196 discloses a process that can be used to produce a ceramic according to the invention in a honeycomb structure from a batch of the type described above. Where that batch contains graphite or carbon powder the honeycomb structure is porous but, intermediate the pores, the mixture of particulate $Al_2O_3$ and at least one of $ZrO_2$ and $HfO_2$, and $Y_2O_3$, is present, is still bonded into a dense, gas impervious structure by the glass.

In another aspect, the instant invention is based upon the discovery that microcracking of a ceramic according to the invention can be eliminated by suitable refiring of the microcracked material, and does not reoccur with aging of the refired ceramic. Whether the ceramic according to the invention is composed of glass, $Al_2O_3$ and $ZrO_2$, $HfO_2$, $Y_2O_3$ or a mixture of two or more of the last three oxides, the refiring can be to a temperature ranging from 870° to 1400°, preferably is to 925° to 1150° and, most desirably, is to 925° to 1035°. It is believed that the refiring softens the glass which bonds the particulate materials together, and that the softened glass forms a continuous phase which, after cooling, is free of microcracks. It is also believed that the original microcracking is associated with a change in the particulate constituents of the ceramic, but the precise nature of the change is not understood. It is known that the stable form of zirconia, of hafnia, and of solid solutions of the two, at low temperatures, is a monoclinic crystalline structure, that a tetragonal crystalline zirconia structure is stable at temperatures from 1170° to 2370°, and that a cubic crystalline zirconia structure is stable at temperatures from 2370° to melting temperature, 2680°. Hafnia and zirconia-hafnia solid solutions undergo the same transformations as zirconia, but at somewhat higher temperatures. It is also known that a given weight of zirconia, of hafnia, or of a zirconia-hafnia solid solution, when in the monoclinic crystalline structure, occupies a greater volume than does the same weight of that material in either the tetragonal or the cubic crystalline structure. Accordingly, the original microcracking could be caused by an increase in the volume occupied thereby occasioned by a change of zirconia, of hafnia, or of a solid solution to the monoclinic crystalline structure, and the refiring, if to an appropriate temperature, could soften the glass which bonds the particulate materials together, as suggested above, without enabling further change to the monoclinic crystalline structure after the ceramic cools. However, the mechanism has not been determined, and it is also possible that chemical reaction is involved, and may be solely responsible for the original microcracking. In any event, the microcracking is eliminated by refiring, as described, and has not been found to reoccur as the refired ceramics age, unless the refiring is to an excessively high temperature.

It is known that $Y_2O_3$ stabilizes $ZrO_2$, $HfO_2$ and solid solutions of the two in the cubic crystalline structure, the stabilization of $ZrO_2$ being complete, it has been reported, when $Y_2O_3$ amounts to about 15 percent, based upon the weight of $ZrO_2$ and $Y_2O_3$. As has been indicated above, a ceramic according to the instant invention made from glass, $Al_2O_3$ and $ZrO_2$, $HfO_2$ or a $ZrO_2$—$HfO_2$ solid solution has excellent resistance to thermal shock and is reasonably strong mechanically, but is subject to microcracking. It has been found, however, that microcracking can be prevented by stabilizing the zirconia or the like with about 3–9 percent of yttria, based on the weight of the $ZrO_2$, $HfO_2$ and $Y_2O_3$ in the ceramic. It has also been found that the ceramic containing stabilized zirconia or the like has good mechanical strength (about comparable to that of a ceramic made from the glass and the $Al_2O_3$), and excellent thermal shock resistance. Since, as has been stated above, yttria stabilizes zirconia in a cubic crystalline structure, the ability of yttria to prevent it suggests that the microcracking which has been observed is caused by a transition which the zirconia undergoes, probably from the tetragonal to the monoclinic structure.

DESCRIPTION OF THE PREFERRED EMBODIMENTS

The following examples are presented solely for the purpose of further illustrating and disclosing the invention. They are to be construed as illustrative, and not as limiting.

EXAMPLE 1

A ceramic batch composed of 16.8 parts of $ZrO_2$, 67.2 parts of $Al_2O_3$ and 16 parts of clays and other fluxes was wet milled, 70 percent solids in water, for 10 hours; a charge of 1.7 parts of a polyethylene glycol was blunged into the ball milled slurry; and the resulting batch was spray dried. The spray dried batch was then pressed isostatically at 5500 psi. (about 38 MPa) around a cylindrical mandrel. The pressed shape, which was generally cylindrical, was then rotated and ground by contact with a rotating, contoured grinding wheel to produce a body having two cylindrical surfaces, both concentric with a bore formed by the mandrel, one of larger diameter than the other. The body was then placed in a setter, smaller diameter end up, and fired to 1510°, 3 hour dwell time, in a periodic kiln. Heating to 1510° required 5 hours, while cooling to ambient temperature of about 20° required 10 hours. The fired insulator which resulted had an overall length of 57 mm., a central bore having a constant diameter of substantially 4 mm., an upper cylindrical portion having a length of 6.4 mm. and a diameter of 14.3 mm., and a lower cylindrical portion having a diameter of substantially 6.6 mm.

The $ZrO_2$ used as described above in Example 1 is commercially available from Harshaw Chemical Co., under the designation Spec. 102 zirconia. The surface area of the $ZrO_2$ is 28 square meters per gram; its "Fisher number" is 0.6; it consists of $ZrO_2$ and 2 to 3 percent of $HfO_2$, assay, $ZrO_2$ and $HfO_2$, 99.7 percent, and incidental impurities.

The "Fisher number" of a material is its median particle size in microns, calculated from size determinations made using a Fisher sub-sieve sizer. The values reported herein are from published data furnished by suppliers.

The $Al_2O_3$ used as described above in Example 1 is commercially available from Aluminum Company of America under the designation A-10 alumina. Substantially all of the material is minus 10 microns in ultimate particle size, the median ultimate particle size being 8 microns; the material is agglomerated, however, so that it has the following size characteristics relative to screens of the U.S. Sieve Series:
100 mesh: 4-15 percent retained
200 mesh: 50-75 percent retained
325 mesh: 88-98 percent retained and 2-12 percent through.
The material consists of $Al_2O_3$, assay 99.5 percent, and incidental impurities.

The clays and other fluxes used as described above in Example 1 contain $SiO_2$, MgO, CaO and $Al_2O_3$ in such proportions that the fired insulator contained 73.2 percent of $Al_2O_3$, 16.8 percent of $ZrO_2$, 7.56 percent of $SiO_2$, 1.68 percent of MgO and 0.76 percent of CaO. Some of the $Al_2O_3$ was dissolved in a glass which also contained the $SiO_2$, the MgO and the CaO. The glass constituted about 10 percent of the fired insulator. The precise amount of $Al_2O_3$ dissolved in the glass was not determined.

The polyethylene glycol used as described above in Example 1 is a water soluble material which is commercially available from Union Carbide Corporation under the designation "Carbowax 3350".

The modulus of rupture of ceramic insulators produced as described in Example 1, measured shortly after they were produced, using 3 point loading, was found to be 61,400±4300 pounds per square inch. Several months later, retained specimens were found to be extensively micro cracked; their modulus of rupture was estimated to be in the vicinity of 20,000 pounds per square inch.

Silver cylinders 25.4 mm. in length were placed in the bores of insulators produced as described in Example 1, substantially 1.6 mm. from the small diameter ends thereof, and powdered talc was packed inside the cylinders under a tampering load of 102 kilograms. The cylinders had a diameter of substantially 4 mm. and a wall thickness of 0.4 mm.; each cylinder was split longitudinally so that the powdered talc, when packed therein, expanded the cylinder into intimate contact with the bore of the insulator. The insulators with the silver cylinders expanded into intimate contact with their bores were then tested for thermal shock resistance. The test inolved immersing the small diameter ends of the cylinders in a molten tin bath at a temperature of 565° to a depth of 31.8 mm. for 15 seconds, inspecting the insulators for cracking*, increasing the bath temperature 28°, reimmersing the insulators which had not cracked, inspecting the reimmersed insulators for cracking, and continuing the steps of increasing bath temperature by increments of 28°, reimmersing the uncracked insulators in the hotter bath and inspecting for insulator cracking until all of the insulators were found to have cracked. Of 21 insulators produced as described in Example 1, none was found to have cracked after reimmersion at a bath temperature of 901°; one was found to have cracked after reimmersion at a bath temperature of 929°; 19 more insulators were found to have cracked after reimmersion at a bath temperature of 957°; and the last of the insulators was found to have cracked after reimmersion at 985°.

*The inspection was visual; it is now believed that dye testing would have revealed microcracking after the first immersion at 565°.

For purposes of comparison, but not in accordance with the instant invention, the procedure described in Example 1 was repeated, except that the ceramic batch which was wet milled was composed of 84 parts of the alumina and 16 parts of the clays and other fluxes. Twenty-two insulators produced as described and fired with the Example 1 insulators, designated "Control a", were fitted with silver cylinders and subjected to the thermal shock test described above. The results of this testing are presented in Table I, below, for Control a, together with the results of testing other insulators produced as described, but fired at different times:

TABLE I

|  | Control a | Control b | Control c | Control d |
|---|---|---|---|---|
| Numbers of insulators tested | 22 | 20 | 20 | 21 |
| Highest immersion temperature at which no cracking was observed | 593° | 593° | 593° | 593° |
| Cumulative No. of insulators cracked after immersion at indicated temp. | | | | |
| 621° | 1 | 1 | 2 | 1 |
| 649° | 2 | 3 | 8 | 5 |
| 677° | 9 | 8 | 12 | 15 |
| 705° | 12 | 14 | 12 | 19 |
| 733° | 22 | 17 | 17 | 20 |
| 761° |  | 19 | 20 | 21 |
| 789° |  | 20 |  |  |

The procedure described in Example 1 has also been used to produce insulators having different compositions. Specifically, the proportions of the zirconium oxide and of the alumina described in Example 1 were varied to alter composition. The parts of $ZrO_2$ and the parts of $Al_2O_3$ used in representative procedures are set forth in the following Table:

|  | Parts of $ZrO_2$ | Parts of $Al_2O_3$ |
|---|---|---|
| Example 2 | 13.0 | 71.0 |
| Example 3 | 14.3 | 69.7 |
| Example 4 | 15.5 | 68.5 |
| Example 5 | 18.1 | 65.9 |
| Example 6 | 19.3 | 64.7 |
| Example 7 | 21.0 | 63.0 |

Insulators produced from the foregoing compositions were fitted with silver cylinders with powdered talc packed inside and were tested for thermal shock resistance as described above. The results of this testing are set forth in Table II, below:

TABLE II

|  | Ex. 2 | Ex. 3 | Ex. 4 | Ex. 5 | Ex. 6 | Ex. 7 |
|---|---|---|---|---|---|---|
| No. of insulators tested | 22 | 22 | 21 | 20 | 20 | 20 |
| Highest immersion temperature at which no cracking was observed | 677° | 649° | 705° | 817° | 901° | 705° |
| Cumulative No. of insulators cracked after immersion at indicated temp. | | | | | | |
| 677° | — | 1 | — | — | — | — |
| 705° | 3 | 2 | — | — | — | — |
| 733° | 13 | 9 | 1 | — | — | 7 |
| 761° | 18 | 16 | 1 | — | — | 13 |
| 789° | 22 | 22 | 1 | — | — | 17 |
| 817° | | | 1 | — | — | 18 |
| 845° | | | 2 | 1 | — | 20 |
| 873° | | | 2 | 1 | — | |
| 901° | | | 2 | 1 | — | |
| 929° | | | 6 | 10 | 17 | |
| 957° | | | 20 | 20 | 20 | |
| 985° | | | 22 | | | |

EXAMPLE 8

Insulators produced as described in Example 1, above, but which had microcracked, were refired to 925°, one hour at temperature. Heating to 925° was at a rate of about 150° per hour, while cooling from 925° to ambient temperature of 20° was at a rate of about 200° per hour. The refired insulators were fitted with silver cylinders as described above except that the tamping load was 68 kilograms instead of 102 kilograms. Twenty four of the insulators were tested for thermal shock resistance by the method described above in comparison with twenty five microcracked insulators of the same composition fitted with silver cylinders into which talc had been packed under a tamping load of 68 kilograms, 20 Control a insulators fitted with silver cylinders using a powdered talc tamping load of 68 kilograms and 20 Control a insulators fitted with silver cylinders using a powdered talc tamping load of 102 kilograms. The results of this testing are presented in Table III, below:

TABLE III

| | Example 8 | Microcracked Example 1 insulators | Control a (Tamping load 68 kilograms) | Control a (Tamping load 102 kilograms) |
|---|---|---|---|---|
| No. of insulators tested | 24 | 25 | 20 | 20 |
| Highest immersion temperature at which no cracking was observed | 677° | 873° | 537° | 565° |
| Cumulative No. of insulators cracked after immersion at indicated temperature | | | | |
| 565° | — | — | 1 | — |

TABLE III-continued

| | Example 8 | Microcracked Example 1 insulators | Control a (Tamping load 68 kilograms) | Control a (Tamping load 102 kilograms) |
|---|---|---|---|---|
| 593° | — | — | 2 | 1 |
| 621° | — | — | 3 | 1 |
| 649° | — | — | 4 | 2 |
| 677° | — | — | 10 | 9 |
| 705° | 1 | — | 18 | 15 |
| 733° | 10 | — | 20 | 20 |
| 761° | 15 | — | | |
| 789° | 24 | — | | |
| 817° | | — | | |
| 845° | | — | | |
| 873° | | — | | |
| 901° | | 16 | | |
| 929° | | 25 | | |

The refired insulators of Example 8 had a modulus of rupture of 55,800 psi., about the same as that of the several controls, Control a, Control b, Control c and Control d, but were significantly superior in thermal shock resistance. The insulators of Example 1, on the other hand, were significantly superior in thermal shock resistance to those even of Example 8, but were much weaker, modulus of rupture 27,300 psi., a few months after they were fired. The same situation has been found to prevail throughout the composition limits set forth above for ceramics according to the instant invention. Accordingly, for applications where extremely high thermal shock resistance is required, and their comparatively low mechanical strength is adequate, the microcracked ceramics according to the instant invention are preferred. On the other hand, for applications where the high mechanical strength properties which are characteristic of alumina ceramics are required, ceramics according to the instant invention which are free of microcracking are preferred, and have significantly higher thermal shock resistance than do their alumina counterparts; such ceramics can be refired (see Example 8, supra), or can contain stabilized zirconia, hafnia, or a solid solution of the two (see Examples 9-12, infra).

Insulators have also been produced by the method described in Example 1 except that zirconia stabilized with yttria was substituted for zirconia. Several different stabilized zirconias, all available commercially from Magnesium Elektron, and all identified in Table IV, below, were used in Examples 9-12, as indicated:

TABLE IV

| | Magnesium Elektron designation | | | |
|---|---|---|---|---|
| | SC10Y6 | SC5Y8 | SC10Y8 | SC16Y12 |
| Median particle size, millimicrons | 2.5 | 8 | 8 | 12 |
| Percent of Yttria | 6 | 8 | 8 | 12 |
| Percent of Hafnia | 1-2 | 1-2 | 1-2 | 1-2 |
| Example | 9 | 10 | 11 | 12 |

Insulators of Examples 9-12 were fitted with silver sleeves (tamping load 102 kilograms) and subjected to the thermal shock test described above. Modulus of rupture was also determined, shortly after the insulators were fired and four months later. The results of this testing are set forth in Table V, below:

TABLE V

|  | Ex. 9 | Ex. 10 | Ex. 11 | Ex. 12 |
|---|---|---|---|---|
| No. of insulators tested | 20 | 20 | 20 | 20 |
| Highest immersion temperature at which no cracking was observed | 677° | 845° | 649° | 677° |
| Cumulative No. of insulators cracked after immersion at indicated temperature |  |  |  |  |
| 677° | — | — | 1 | — |
| 705 | 2 | — | 2 | 5 |
| 733 | 3 | — | 7 | 10 |
| 761 | 4 | — | 11 | 12 |
| 789 | 7 | — | 19 | 19 |
| 817 | 8 | — | 20 | 19 |
| 845 | 12 | — |  | 20 |
| 873 | 15 | 2 |  |  |
| 901 | 18 | 13 |  |  |
| 929 | 20 | 20 |  |  |
| Modulus of rupture, psi., shortly after insulators were fired | 69,200 | 65,300 | 68,600 | 64,200 |
| Modulus of rupture, psi., approx. four months after insulators were fired | 64,700 | 62,000 | 59,100 | 62,700 |

The modulus of rupture of insulators produced as described in Examples 2 through 6 was determined, shortly after they were fired and, again, several months later. The results of this testing are set forth in Table VI, below:

TABLE VI

|  | Modulus of rupture, psi. | |
|---|---|---|
|  | Shortly after the insulators were fired | Several months after the insulators were fired |
| Example 2 | 63,100 | 58,800 |
| Example 3 | 59,200 | 53,700 |
| Example 4 | 59,700 | 33,900 |
| Example 5 | 56,300 | 27,300 |
| Example 6 | 39,400 | 26,900 |

EXAMPLE 13

The procedure described in Example 1, except that the firing temperature was 1550°, two hours at temperature, was used to produce insulators from a batch composed of 75.1 parts of A-10 alumina, 18.8 parts of zirconia that is commercially available under the designation "Transelco 104-2 zirconia" from Transelco Division of Ferro Corporation, and 6.1 parts of clays and other fluxes.

The "Transelco 104-2 zirconia" used as described in Example 13 had a surface area of 7 square meters per gram, a Fisher number of 0.5, and an assay of 98.5 percent $ZrO_2$ and $HfO_2$. $HfO_2$ constituted from 1 to 2 percent of the material.

The clays and other fluxes used as described in Example 13 contain $SiO_2$, MgO, CaO and $Al_2O_3$ in such proportions that the fired insulators contained 76.2 percent of $Al_2O_3$, 18.8 percent of $ZrO_2$, 3.78 percent of $SiO_2$, 0.84 percent of MgO, and 0.38 percent of CaO. Some of the $Al_2O_3$ was dissolved in a glass which also contained the $SiO_2$, the MgO and the CaO. The glass constituted about five percent of the fired insulator. The precise amount of $Al_2O_3$ dissolved in the glass was not determined.

Twenty of the insulators produced as described in Example 13 were fitted with silver cylinders, tamping load 102 kilograms, and subjected to the thermal shock test described above. The results of this testing are presented in Table VII, below:

TABLE VII

| Highest immersion temperature at which no cracking was observed | 649° |
|---|---|
| Cumulative No. of insulators cracked after immersion at indicated temp. |  |
| 677° | 1 |
| 705° | 3 |
| 733° | 5 |
| 761° | 11 |
| 789° | 19 |
| 817° | 20 |

The two commercially available zirconias identified in Table VIII, below, have been substituted for the zirconias used in the procedures described in some of the foregoing examples. In all cases, the insulators which were produced were found to have greater shock resistance than did insulators of the type of Controls a through d.

TABLE VIII

| Trade Designation | TAM Electronic Grade Zirconia | TAM Zirox 360 Zirconia |
|---|---|---|
| Surface area, square meters per gram | 7.5 | — |
| Fisher No. | 0.8 | 3.5 |
| Median particle size, microns | — | 8 |
| Assay, $ZrO_2$ and $HfO_2$, percent | 99.2 | 98.5 |
| $HfO_2$, percent | 1–2 | 1–2 |

It will be apparent that various changes and modifications can be made from the specific details of the instant invention discussed above and described in the foregoing Examples without departing from the spirit and scope thereof as defined in the appended claims.

What I claim is:

1. A ceramic composed of from 1 to 15 percent of glass and 99 and 85 percent of a mixture of particulate $Al_2O_3$ and at least one other particulate material selected from the group consisting of $ZrO_2$, $HfO_2$, $ZrO_2$—$HfO_2$ solid solutions and $Y_2O_3$, the particulates all being finer than 15 microns in ultimate particle size, $ZrO_2$, $HfO_2$ and $Y_2O_3$ constituting from 15 to 25 percent based upon the weight of $ZrO_2$, $HfO_2$, $Y_2O_3$ and $Al_2O_3$ in the ceramic, $Y_2O_3$ constituting up to 12 percent based upon the weight of the $ZrO_2$, $HfO_2$ and $Y_2O_3$, and said glass constituting a vitreous phase bonding the mixture of particulates into a dense, gas impervious structure, and being a calcium magnesium silicate glass containing from 45 to 80 percent of $SiO_2$, from 8 to 55 percent of CaO and MgO, and not more than 15 percent of $Al_2O_3$.

2. A ceramic as claimed in claim 1 wherein the glass constitutes from 3 to 12 percent thereof.

3. A ceramic as claimed in claim 1 wherein the glass constitutes from 5 to 10 percent thereof.

4. An open celled, porous article composed of the ceramic claimed in claim 1.

5. A ceramic as claimed in claim 1 which is microcracked, the cracks being invisible to the naked eye, but detectable by a dye test.

6. A ceramic as claimed in claim 1 which contains from 3 to 6 percent of $Y_2O_3$, based upon the weight of the $ZrO_2$, $HfO_2$ and $Y_2O_3$ therein.

7. A ceramic as claimed in claim 1 which contains from 3 to 9 percent of $Y_2O_3$, based upon the weight of the $ZrO_2$, $HfO_2$ and $Y_2O_3$ therein.

8. A method for producing a ceramic, said method comprising pressing a batch into a desired shape, firing the shape to a temperature from about 1350° to about 1650° to mature the ceramic, cooling the ceramic, and refiring the ceramic to a temperature of at least about 870° but not so high that the ceramic is subject to microcracking upon standing under ambient temperatures, said batch being one which, after firing of the shape to about 1350° to about 1650° to maturity, produces a ceramic composed of from 1 to 15 percent of glass and 99 to 85 percent of a mixture of particulate $Al_2O_3$ and at least one other particulate material selected from the group consisting of $ZrO_2$, $HfO_2$, $ZrO_2$—$HfO_2$ solid solutions and $Y_2O_3$, the particulates all being finer than 15 microns in ultimate particle size, $ZrO_2$, $HfO_2$ and $Y_2O_3$ constituting from 15 to 25 percent based upon the weight of $ZrO_2$, $HfO_2$, $Y_2O_3$ and $Al_2O_3$ in the ceramic, $Y_2O_3$ constituting up to 12 percent based upon the weight of the $ZrO_2$, $HfO_2$ and $Y_2O_3$, and said glass being a calcium magnesium silicate glass containing from 45 to 80 percent of $SiO_2$, from 8 to 55 percent of CaO and MgO, and not more than 15 percent of $Al_2O_3$.

9. A ceramic produced by the method claimed in claim 8, and which is free of microcracks that can be detected by a dye test.

10. A method as claimed in claim 9 wherein the particulate mixture is substantially devoid of $Y_2O_3$, and which includes the additional step of refiring the ceramic to a temperature from 870° to 1400°.

11. A method as claimed in claim 10 wherein the refiring is to a temperature from 925° to 1150°.

12. A method as claimed in claim 10 wherein the refiring is to a temperature from 925° to 1035°.

* * * * *